United States Patent Office 3,516,954
Patented June 23, 1970

3,516,954
NOVEL COMPOSITIONS FOR PREPARING POLYURETHANE COATINGS
Uwe Ploog, Dusseldorf, Werner Stein, Erkrath-Unterbach, and Joachim Barnstorf, Hilden, Rhineland, Germany, assignors to Henkel & Cie., G.m.b.H., Dusseldorf, Holthausen, Germany, a corporation of Germany
No Drawing. Filed Oct. 12, 1967, Ser. No. 674,725
Claims priority, application Germany, Feb. 10, 1967, H 61,817
Int. Cl. C08g 22/08
U.S. Cl. 260—18       9 Claims

ABSTRACT OF THE DISCLOSURE

Novel compositions for preparing flexible polyurethane coatings having a high chemical and mechanical resistance comprised of a polyisocyanate and an aliphatic-cycloaliphatic polyhydroxyl containing component formed by hydrogenation of an adduct of a phenol compound, added to a compound selected from the group consisting of an unsaturated alcohol having 10 to 48 carbon atoms, adducts thereof with ethylene oxide or propylene oxide, unsaturated carboxylic acids of 10 to 48 carbon atoms and esters thereof with aliphatic alcohols of 1 to 4 carbon atoms, and the polyurethane coatings produced therewith.

PRIOR ART

The use of lacquers comprised of polyvalent isocyanates and polyesters having free hydroxy groups prepared by esterification of dicarboxylic acids with di- or trihydroxy alcohols as protective coatings for a wide variety of materials is well known. However, the coatings prepared from these lacquers have various disadvantages in their resistance to hydrolysis due to the presence of the ester group. Lacquers comprised of polyvalent isocyanates and polyglycol ethers for forming coatings are also known but these coatings are also susceptible to aqueous chemical solutions.

Also, it is known that lacquers, stable at room temperatures, can be obtained from the reaction of an organic polyisocyanate with an aliphatic, cycloaliphatic or araliphatic monoalcohol and a polyamide, but such lacquers do not have any self-crosslinking, cold-hardenable coating agent. Air-drying lacquers derived from diisocyanates and unsaturated monoalcohols are also known, but these lacquers have to be hardened with the addition of specific organo-metallic compounds. In the last two instances, no compounds containing several hydroxyl groups are used. Finally, coating agents comprised of polyisocyanates and short chain alcohols such as butanediol and decamethyleneglycol are also known but these lacquer compositions are only slowly hardenable at room temperature which is undesirable and therefore have to be hardened at elevated temperatures.

OBJECTS OF THE INVENTION

It is an object of the invention to provide novel lacquer compositions for forming polyurethane coatings which have a high color stability and a high chemical and mechanical resistance.

It is another object of the invention to provide novel coating compositions which have a sufficiently long pot-life but are hardenable at room temperature within a relatively short time.

It is a further object of the invention to provide objects with a polyurethane coating which have a high chemical and mechanical resistance.

These and other objects and advantages of the invention will become obvious from the following detailed disclosure.

THE INVENTION

The novel compositions of the invention useful for preparing polyurethane coatings having a high chemical and mechanical resistance are comprised of an organic polyisocyanate and an aliphatic-cycloaliphatic polyhydroxyl containing compound obtained by hydrogenation of an adduct of a phenol and a compound selected from the group consisting of unsaturated, branched and straight chain alcohols of 10 to 48 carbon atoms, condensation products of said alcohols with an alkylene oxide selected from the group consisting of ethylene oxide and propylene oxide, unsaturated aliphatic carboxylic acids of 10 to 48 carbon atoms and alkyl esters thereof having 1 to 4 alkyl carbon atoms and condensation products of said aliphatic-cycloaliphatic polyhydroxyl compounds with an alkylene oxide selected from the group consisting of ethylene oxide and propylene oxide in an inert organic solvent, the ratio of isocyanate groups to hydroxy groups being about 1 to 4.0.

The hydroxyl containing adducts can be advantageously prepared by reacting phenols or phenol-derivatives with unsaturated, straight or branched chain alcohols having 10 to 48 carbon atoms, or their alkoxylated derivatives in the presence of acid aluminum silicates as catalysts at a temperature of 100°–250° C. Particularly suitable catalysts are aluminum silicates, activated with mineral acids and having a pH-value of 3–5 and the said silicates are used in an amount of 1–15% by weight of the reaction mixture. It is to be noted that if there are several double bonds in a straight carbon chain of the alcohol molecule and an excess of the phenol is used, only one mol of phenol is added onto this carbon chain. For branched chain products, such as Guerbet alcohols, one mol of phenol can be added to each individual carbon chain as long as the branched chains contain double bonds.

Suitable phenol compounds are aromatic alcohols which can be alkylated due to the presence of at least one exchangeable hydrogen atom on the aromatic ring. Examples of suitable phenols are phenol, polyhydroxy phenols such as pyrocatechol, pyrogallol, hydroquinone; alkylated phenols such as cresols, xylenols; halogenated phenols; naphthols such as α-naphthol; and phenols having several aromatic rings such as Bisphenol A o,o'-diphenol, etc.

The unsaturated alcohols of 10 to 48 carbon atoms may be mono- or polyunsaturated. Examples of suitable alcohols are unsaturated fatty alcohols such as decenol, dodecenol, hexadecenol, octadecenol or oleyl alcohol, octadecadiene-9,12-ol or linolenyl alcohol, octadecatriene-9,12,15-ol or linolenyl alcohol, etc. Particularly useful are unsaturated fatty alcohols derived from natural waxes or from unsaturated fatty acids of natural oils and fats which may be in pure form or mixtures. Examples of said alcohols are Sojacenol obtained by hydration of soy bean oil while preserving the double bonds which is predominantly unsaturated $C_{18}$ alcohols and Leinocenol obtained by hydration of linseed oil while preserving the double bonds. Also suitable are Guerbet alcohols of mono- or polyunsaturated fatty alcohols or mixtures thereof and particularly unsaturated alcohols derived from natural waxes or unsaturated fatty acids of natural fats and oils by the Guerbet reaction such as Guerbet alcohols of Sojacenol called Sojaguerbet alcohol or of Leinocenol called Leinguerbert alcohol. Also useful are the condensation products of the said alcohols with 1 to 6 moles of ethylene oxide and/or propylene oxide.

The hydroxyl-containing adducts may also be condensed with 1 to 6 moles of ethylene oxide and/or propylene oxide which has the advantage of simultaneously varying the degree of flexibility and increasing the chemical resistance of the final polyurethane coatings. Preferably, the hydroxyl containing adducts are condensed with 1 to 6 mols of propylene oxide. High molar ratios of propylene oxide results in decreased chemical resistance. The said condensation products can be prepared by condensing a few moles of alkylene oxide with the unsaturated fatty alcohol, reacting the condensation product with the phenol and condensing a few more moles of the alkylene oxide with the resulting hydroxyl containing adduct.

The polyhydroxyl-containing adducts can also be formed advantageously by reacting a phenol with an unsaturated, straight or branched chain carboxylic acid of 10 to 48 carbon atoms or lower alkyl esters thereof having 1 to 4 alkyl carbon atoms under the same conditions as with the unsaturated alcohols.

Examples of suitable unsaturated carboxylic acids of 10 to 48 carbon atoms are undecylenic acid, oleic acid, eladinic acid, erucic acid, brassidic acid, tall oil fatty acids, linoleic acid, eleostearic acid, linolenic acid and esters thereof such as methyl, ethyl, propyl, isopropyl or butyl esters. The acids may be mono- or polyunsaturated or may contain conjugated double bonds. Particularly useful are unsaturated fatty acids and their methyl esters derived from natural fats, oils and waxes in admixtures in pure form. Also suitable are dimeric fatty acids produced from polyunsaturated fatty acids, particularly those obtained from natural oils and fats by known dimerization processes and their alkyl esters such as methyl esters.

The said phenol adducts can be hydrogenated in known manner to form the aliphatic-cycloaliphatic di- and polyhydroxyl compounds to be used in the compositions of the invention. For example, the phenol adduct can be admixed with 5 to 15% by weight of the adduct, of a hydrogenation catalyst such as a copper-chromium oxide catalyst and hydrogenated at temperatures of 100 to 400° C., preferably 250 to 300° C. and at a hydrogen pressure of 50 to 350 atmospheres, preferably 150 to 275 atmospheres, until the hydrogenation is substantially complete. The practically pure aliphatic-cycloaliphatic polyhydroxyl compound is immediately recovered. The polyhydroxyl compound will have a secondary hydroxyl on the hydrogenated ring for every phenolic hydroxyl on the original phenol and will have a primary hydroxyl for every hydroxyl or carboxylic acid group on the original unsaturated component of the adduct. The hydrogenation leads to the same aliphatic-cycloaliphatic dioles or polyoles, no matter if the hydrogenation is started with a phenol-fatty alcohol-adduct, the corresponding phenol-fatty acid adduct or with the corresponding phenol-fatty acid ester-adduct.

All cases give a high yield of practically colorless aliphatic-cycloaliphatic polyhydroxyl compounds possessing very good properties for further processing to polyurethanes. Should the color prove in some cases to be not entirely satisfactory, the discoloration can be eliminated for example by treatment thereof with a 1% alkaline dithionite solution at a temperature of 50° C. for about one hour. The said aliphatic-cycloaliphatic polyhydroxyl compounds form polyurethane of high color stability and of excellent chemical and mechanical resistance. In some cases, where specific mechanical or chemical properties are required, it may be advantageous to use, instead of the polyhydroxyl compounds, condensation products of these compounds with 1–6 moles of ethylene oxide or propylene oxide per mol of hydrogenation product. The flexibility of the coatings can thereby be varied within certain limits ensuing in some cases simultaneously an improvement in the chemical stability. A particularly favorable behavior has been displayed by the reaction products with 1 to 6 moles of propylene oxide. When products with higher molecular alkylene oxide contents are used, the chemical resistance is apt to diminish. In the place of the condensation products of the hydrogenated adducts with alkylene oxides, there can be used the phenol adducts condensed with the alkylene oxides and then hydrogenating the resulting product. The ethoxylation or propoxylation of the hydrogenated phenol addition products as well as of the not yet hydrogenated phenol addition compounds can be effected in the usual manner.

The hydroxyl containing adducts should be as free as possible of non-reacted phenols or unsaturated fatty alcohols since the said starting materials disrupt chain formation and thus impair the preparation of the high molecular weight polyurethanes. Preferably the said adducts are the sole hydroxyl containing ingredient in the mixture, although up to 10% by weight of other known hydroxyl compounds such as trimethylolpropane, glycol, glycerine, etc., used in polyurethane coatings may be added thereto. Preferably 0.5 to 1.5% by weight of trimethylol propane is used.

The organic polyisocyanate used in the compositions are well known aliphatic and aromatic di- or polyisocyanates and their adducts with polyvalent low molecular weight alcohols. Examples of suitable polyisocyanates are hexamethylene diisocyanate, toluylene diisocyanate, p,p'-diphenyl diisocyanate, p,p'-diphenylmethane diisocyanate, p-phenylene diisocyanate, p,p',p''-triphenylmethane triisocyanate and adducts thereof such as 3 moles of toluylene diisocyanate with 1 mole of trimethylolpropane.

The compositions are preferably prepared by dissolving the hydroxyl containing adduct in an inert organic solvent such as ethyl acetate, benzene, toluene, xylene, methylene chloride, dioxane, diacetate of ethylene glycol, etc., and then adding the desired amount of polyisocyanate. Depending upon the specific components and the use of the final coating, stoichiometric, slight excess or slight deficiency of the polyisocyanate is used. An excess of polyisocyanate is preferred with alkylene oxide condensation products.

The rate of the hardening process as well as the properties of the films can also be influenced by the use of catalysts. As suitable and well known catalysts, tertiary amines or their acid salts, such as triethylamine can be used in an amount of 0.001–0.1% by weight of the total mixture depending upon the type of the hydroxyl containing compound used and the use to be made of the coatings.

The compositions of the invention comprised of polyisocyanate, solvent, hydroxyl containing compound and optionally a low molecular weight polyhydroxyl compound and catalyst are compatible with pigments such as zinc chromate, titanium dioxide, talc, etc. The compositions can be applied to dry surfaces to be coated by spraying, painting or dipping in the usual manner. Depending upon the selection of the polyisocyanate component and the other components, they harden at room temperature in about 1–4 hours in a dust-dry manner. The lacquer layers obtain their final hardness in about 3–5 days. Of course, the hardening process can be effected at elevated temperature in a correspondingly shorter time.

The compositions of the invention provide well adhering, color-fast coatings with a varying flexibility depending upon use on metals, wood, rubber, plastics, textiles, paper, etc. The coatings display outstanding abrasion resistance and gloss and uniform coverage and a remarkably high resistance to hydrolyzing chemicals such as aqueous alkaline solutions. The compositions which contain a hydroxyl containing adduct condensed with ethylene oxide and particularly propylene oxide have simultaneously a very high chemical resistance and good flexibility and color-fastness.

In the following examples, there are described several preferred embodiments to illustrate the invention. However, it should be understood that the invention is not intended to be limited to the specific embodiments.

EXAMPLES

The adducts of a phenol and an unsaturated compound of Table I were prepared in the following manner. The phenol and the unsaturated compound were introduced into a reaction vessel provided with a stirrer, a thermometer and a reflux condenser in the molar amounts shown in Table I with 5 or 10% by weight of Tonsil L 80 (a commercial fuller's earth having a pH of 3.8) previously dried at 120° C. for 3 hours as a catalyst. The resulting reaction mixture was heated to the temperature shown in Table I for 4 hours under an atmosphere of nitrogen and with vigorous stirring. The reaction mixture was then cooled to 100° C. and the catalyst was removed therefrom by vacuum filtration. The unreacted phenols and unsaturated alcohols were distilled off up to a temperature of 190° C. at 0.01 torr and the residue was the desired adduct having the hydroxyl number given in Table I. The percent yield was based on one mole of phenol to be added to each unsaturated hydrocarbon chain which means that for a 100% yield one mole of the phenol is added to each unsaturated hydrocarbon chain.

lyst activated with barium chromate as described by Akins (Foerst, Neuere Methoden der Präparation Organischen Chemie, Bd. 1 (1943), p. 122). To prepare the said catalyst, 900 cc. of an aqueous solution of 260 gm. of cupric nitrate hydrate $[Cu(NO_3)_2 \cdot 3H_2O]$ and 31 gm. of barium nitrate at a temperature of 80° were poured into 900 cc. of an aqueous solution of 151 gm. of ammonium bichromate and 225 cc. of 28% ammonium hydroxide at 25° C. The precipitate formed was vacuum filtered and the filter cake was pressed dry with a spatula and vacuum filtered as dry as possible. The product was then dried for 12 hours in a drying oven at 75–80° C. and then pulverized.

The product was divided into 3 portions and each portion was thermally decomposed by heating the product in a 15 cm. diameter porcelain dish over an open flame. The said decomposition was effected with continuous

TABLE I

| Example | Starting Materials | | Molar Ratio | Percent by weight of Tonsil L 80 | Reaction Temp., °C. | Hydroxyl No. | Percent Yield |
|---|---|---|---|---|---|---|---|
| | Phenol | Unsaturated Compound | | | | | |
| 1 | Phenol | Oleyl alcohol | 3:1 | 10 | 163 | 268 | 92 |
| 2 | Cresol | Isomerized soya fatty acid | 3:1 | 5 | 160 | [1] 58.9 | 75 |
| 3 | Phenol | Methyl oleate | 3:1 | 10 | 176 | 119 | 100 |
| 4 | do | Methyl ester of linseed oil fatty acids | 3:1 | 10 | 172 | 127 | 100 |
| 5 | do | Methyl erucate | 3:1 | 10 | 180 | 119 | 100 |
| 6 | do | Methyl undecylenate | 2:1 | 5 | 180 | 164.9 | 90 |

[1] Acid No. −147.8.

Several of the phenol-alcohol adducts of Table I were further condensed with ethylene oxide or propylene oxide according to the following procedure. The adducts were reacted at 100° C. with sufficient methanol solution containing 30% sodium methylate to have 0.2% by weight of sodium for the said adduct. The resulting clear, warm solution was heated at 60° C. under vacuum to distill off the methanol and then heated in an autoclave under a nitrogen atmosphere to the reaction temperature shown in Table II. Then the alkylene oxide was added in the molar ratios of Table II under a pressure of about 6 atmospheres after which the alkoxylated product was neutralized with concentrated formic acid and vacuum filtered while hot to remove the precipitated sodium formate.

TABLE II

| | Example 7 | Example 8 |
|---|---|---|
| Adduct from Table I | 3 | 3 |
| Alkylene Oxide | (1) | (2) |
| Molar Ratio | 1:1 | 1:1 |
| Reaction Conditions: | | |
| Time in hours | 3 | 4 |
| Temp., °C | 150 | 150 |
| Hydroxyl No | 96.1 | 87.8 |

[1] Ethylene oxide.
[2] Propylene oxide.

The phenol adducts of Tables I and II were hydrogenated using a pulverized copper-chromium oxide catalyst stirring with a steel spatula and with flame adjustment to avoid too intense gas generation. To proceed at the lowest possible temperature, only one side of the porcelain dish was heated and the speed of stirring was increased as soon as decomposition affected the entire mass. The color of the powder changed from orange to brown and then to black. After the powder had a uniform black color and gas generation abated, the powder was allowed to cool. The three portions were then combined, treated with 600 cc. of 10% acetic acid with constant stirring and then was vacuum filtered. After washing the filtrate 6 times with 100 cc. aliquots of water, the catalyst was dried for 12 hours at 125° C. and then pulverized to obtain 170 gm. of catalyst.

The adduct to be hydrogenated was admixed with about 10% by weight of the said copper-chromium oxide catalyst in a high pressure autoclave equipped with a magnetic stirring device and was hydrogenated at the temperatures and pressure of Table III until hydrogenation was complete. Then the reaction mixture was diluted with an equal amount of acetone and the mixture was vacuum filtered. Solvent and mono-functional products were removed by distillation at 100–150° C. under first water jet vacuum and then high pressure vacuum to obtain the cycloaliphatic diols of Table III having excellent color values. To improve the color values even more for special cases, the products can be treated with an alkaline 1% dithionite solution for 1 hour at 50° C.

TABLE III

| Number | 9 | 10 | 11 | 12 | 13 | 14 | 15 | 16 | 17 | 18 |
|---|---|---|---|---|---|---|---|---|---|---|
| Adduct No | 3 | 4 | 5 | 6 | 1 | 7 | 8 | 7 | 2 | 8 |
| Percent Contact | 10 | 8 | 10 | 10 | 10 | 10 | 10 | 10 | 10 | 10 |
| Hydrogenation Conditions: | | | | | | | | | | |
| Temp., °C | 250 | 250 | 250 | 252 | 250 | 250 | 250 | 300 | 250 | 300 |
| Atm. pressure | 150 | 150 | 210 | 252 | 250 | 227 | 268 | 230 | 200 | 200 |
| Time in hours | 24 | 24 | 11 | 9 | 24 | 8 | 11 | 5 | 3.5 | 4 |
| Liter of $H_2$ | | | 175 | 204 | 111 | 124 | 113 | 131 | 32.5 | 90 |
| Product values: | | | | | | | | | | |
| Acid No | 0.4 | 0.3 | 0.5 | 0.4 | 0.3 | 06 | 0.7 | 0.3 | 0.7 | 0.4 |
| Saponification No | 3.8 | 5.6 | 6 | 11.8 | 15.5 | 10 | 3.2 | 17.9 | 8.9 | 18.9 |
| Hydroxy No | 268.5 | 261.6 | 231 | 363.4 | 232 | 256 | 269 | 223.8 | 184.7 | 233 |
| Iodine No | 17.2 | 44.8 | 18.3 | 21.2 | 29.8 | 36.7 | 37.0 | 25.8 | 15.5 | 26.8 |
| Percent distillable portion based on adduct at 350° at 0.01 mm. Hg | [1] 85 | [2] 65 | 81.3 | 92.1 | [3] 68 | 87.4 | 84.5 | 74.9 | 85 | 75 |
| Color values (Lovibond Tintometer 1″ cup): | | | | | | | | | | |
| Yellow | 0.4 | 0.1 | | | | | 0 9. | | | |
| Red | 2.4 | 0.5 | | | | | 0.0 | | | |
| Blue | 0.0 | 0.0 | | | | | 0.1 | | | |

[1] (70).  [2] (50).  [3] (52.5).

Using the procedure used to form the products of Table II, the following products of Table III were condensed with alkylene oxide.

TABLE IV

| Example | 19 | 20 | 21 | 22 |
|---|---|---|---|---|
| Adduct | 9 | 9 | 9 | 9 |
| Alkylene Oxide | (¹) | (²) | (²) | (²) |
| Molar Ratio | 1:2 | 1:2 | 1:4 | 1:6 |
| Reaction Conditions: | | | | |
| Time in hours | 5 | 5 | 5 | 5 |
| Temp., °C | 150 | 150 | 150 | 150 |
| Hydroxyl No | 218 | 207 | 177 | 149 |

¹ Ethylene oxide.
² Propylene oxide.

The adducts of Tables III and IV were then dissolved in anhydrous ethyl acetate with or without the trimethylolpropane having a hydroxyl number of 1,219 and/or triethylamine indicated in Table V. The said solutions were then reacted with the isocyanate solutions indicated in Table I to obtain a 50% lacquer solution and the resulting solutions were allowed to stand for 1½ hours at room temperature after which the solutions were poured on to glass plates to form clear films. The plates were aged for 1 day at room temperature and the resulting films were removed from the plates and stored for 3 days at 50° C. Each of the films prepared from the compositions of the invention were clear, hard and flexible. The chemical resistance of the films was determined by hanging the strips in water, a 20% aqueous sodium hydroxide solution and 20% aqueous hydrochloric acid at 100° C. For comparative purposes, films were prepared from compositions using as the hydroxyl containing compounds, Desmophen 800 (polyester of adipic acid, phthalic acid and a trihydroxy alcohol having a hydroxyl number of 298) and Desmophen 1100 (polyester of adipic acid, butylene glycol and di- and trihydroxyl alcohols having a hydroxyl number of 220).

The mechanical properties of all the clear films as determined by their tensile strength, impact resistance, elongation and abrasion was satisfactory and did not differ noticeably.

Isocyanate solution A of Table III was a 75% solution of the adduct of toluene diisocyanate and trimethylolpropane in a 3:1 molar ratio which is sold under the name Desmodur L 75 and isocyanate solution N of Table III is a 75% solution of the condensation of hexamethylene diisocyanate with water in a 3:1 molar ratio which is sold under the name Desmodur N.

The results are reported in Table V and the values used to report the results have the following definitions:

U—unchanged
F—colors dark
W—takes on a white color
Z—becomes decomposed
+=start
++=moderate
+++=intense
++++=very intense

TABLE V

| Ex. | Lacquer Composition | Molar Ratio of NCO:OH | Pot Life | Chemical Resistance | Time in Solution | | | | |
|---|---|---|---|---|---|---|---|---|---|
| | | | | | 5′ | 15′ | 30′ | 1 h. | 3 h. |
| 1 | 5 g. Desmophen 800<br>10 g. isocyanate solution A<br>9 g. ethyl acetate | 1.3:1 | 2 days | H₂O<br>NaOH, 20%<br>HCl, 20% | U<br>W++++<br>F+ | U<br>W++++<br>F+ | U<br>Z++<br>F+ | U | U |
| 2 | 5 g. Desmophen 1100<br>7.5 g. isocyanate solution A<br>9 g. ethyl acetate | 1.3:1 | 2 days | H₂O<br>NaOH, 20%<br>HCl, 20% | U<br>W++++<br>F+ | W+<br>W++++<br>F+ | W+<br>Z++<br>F+ | W+ | W+ |
| 3 | 2.5 g. adduct No. 10<br>4.3 g. isocyante solution A<br>4.5 g. ethyl acetate | 1.1:1 | >2 days | H₂O<br>NaOH, 20%<br>HCl, 20% | U<br>U<br>U | U<br>U<br>U | U<br>U<br>U | U<br>W<br>U | U<br>W+<br>U |
| 4 | 2.5 g. adduct No. 11<br>3.8 g. isocyanate solution A<br>3.5 g. ethyl acetate<br>1 gm. 0.01% by weight of trimethylamine solution in ethyl acetate (0.001 Gew. percent). | 1.1:1 | 4 days | H₂O<br>NaOH, 20%<br>HCl, 20% | U<br>U<br>U | U<br>W<br>U | U<br>W<br>U | U<br>W<br>U | U<br>W<br>U |
| 5 | 2.5 g. adduct 20<br>3.42 g. isocyanate solution A<br>3.5 g. ethyl acetate<br>1 g. 0.01% triethylamine in ethylacetate (0.001% by weight). | 1.1:1 | >2 days | H₂O<br>NaOH, 20%<br>HCl, 20% | U<br>U<br>U | U<br>U<br>U | U<br>U<br>U | U<br>U<br>U | U<br>U<br>U |
| 6 | 2.5 g. adduct 21<br>3.98 g. isocyanate solution A<br>4.5 g. ethylacetate | 1.5:1 | 2 days | H₂O<br>NaOH, 20%<br>HCl | U<br>U<br>U | U<br>U<br>U | U<br>U<br>F | U<br>U<br>F+ | U<br>W+++<br>F+ |
| 7 | 2.5 g. adduct 14<br>4.6 g. isocyanate solution A<br>3.5 g. ethylacetate<br>1 g. triethylamine solution in ethylacetate (0.001% by weight). | 1.2:1 | 6 days | H₂O<br>NaOH, 20%<br>HCl, 20% | U<br>U<br>U | U<br>U<br>U | U<br>U<br>U | U<br>U<br>U | U<br>W<br>U |
| 8 | 2.5 g. adduct 16<br>4.0 g. isocyanate solution A<br>3.5 g. ethyl acetate<br>1 g. 0.01% triethylamine in solution in ethylacetate (0.001 Gew. percent). | 1.2:1 | 4 days | H₂O<br>NaOH, 20%<br>HCl, 20% | U<br>U<br>U | U<br>U<br>U | U<br>U<br>U | U<br>U<br>U | U<br>U<br>U |
| 9 | 2.5 g. adduct 15<br>4.9 g. isocyanate solution A<br>4.5 g. ethylacetate | 1.2:1 | 3 days | H₂O<br>NaOH, 20%<br>HCl, 20% | U<br>U<br>U | U<br>U<br>U | U<br>U<br>U | U<br>U<br>U | W+<br>U<br>U |
| 10 | 2.5 g. adduct 18<br>3.85 g. isocyanate solution A<br>4.5 g. ethyl acetate | 1.1:1 | 7 days | H₂O<br>NaOH, 20%<br>HCl, 20% | U<br>U<br>U | U<br>U<br>U | U<br>U<br>U | U<br>U<br>U | U<br>U<br>U |
| 11 | 2.5 g. 1:1 mixture of adduct 9 and adduct 19<br>4.1 g. isocyanate solution A<br>4.5 g. ethyl acetate | 1.1:1 | 3 days | H₂O<br>NaOH, 20%<br>HCl, 20% | U<br>U<br>U | U<br>U<br>U | U<br>U<br>U | U<br>U<br>U | U<br>U<br>U |
| 12 | 2.5 g. 1:1 mixture of adduct 9 and adduct 20<br>3.6 g. isocyanate solution A<br>3.5 g. ethyl acetate<br>1 g. 0.01% triethylamine in solution in ethyl acetate (0.001% by weight). | 1:1 | 3 days | H₂O<br>NaOH, 20%<br>HCl, 20% | U<br>U<br>U | U<br>U<br>U | U<br>U<br>U | U<br>U<br>U | U<br>U<br>U |
| 13 | 2.5 g. adduct 10<br>3.7 g. isocyanate solution N<br>4.5 g. ethyl acetate | 1.5:1 | 7 days | H₂O<br>NaOH, 20%<br>HCl, 20% | U<br>U<br>U | U<br>U<br>U | U<br>U<br>U | U<br>U<br>U | U<br>U<br>U |

We claim:
1. A composition for preparing polyurethane coatings having a high chemical and mechanical resistance comprising an inert organic solvent containing (1) an organic polyisocyanate and (2) a member of the group consisting of
   (A) an aliphatic-cycloaliphatic polyhydroxyl containing compound obtained by substantially complete hydrogenation of an adduct of a phenol and an unsaturated compound selected from the group consisting of unsaturated branch and unsaturated straight chain alcohols of 10 to 48 carbon atoms, condensation products of said alcohols with ethylene oxide or propylene oxide, unsaturated aliphatic carboxylic acids of 10 to 48 carbon atoms and alkyl esters of said carboxylic acids having 1 to 4 alkyl carbon atoms and condensation products of said acids or esters with ethylene oxide or propylene oxide and
   (B) condensation products of said aliphatic-cycloaliphatic polyhydroxyl compounds with ethylene oxide or propylene oxide, the said adduct having at least one mole of phenol per mole of unsaturated compound, the ratio of isocyanate groups to hydroxy groups being 1:1 to 4:1.

2. The composition of claim 1 wherein the unsaturated compound is selected from the group consisting of an unsaturated fatty alcohol of 10 to 48 carbon atoms and condensation products thereof with an alkylene oxide selected from the group consisting of ethylene oxide and propylene oxide.

3. The composition of claim 1 wherein the unsaturated compound is selected from the group consisting of unsaturated fatty acids of 10 to 48 carbon atoms, alkyl esters thereof having 1 to 4 alkyl carbon atoms and condensation products of said acids and esters with an alkylene oxide selected from the group consisting of ethylene oxide and propylene oxide.

4. The composition of claim 1 wherein the composition contains 0.5–1.5% by weight of trimethylolpropane.

5. The composition of claim 1 wherein the unsaturated compound is selected from the group consisting of unsaturated dimeric fatty alcohols of 10 to 48 carbon atoms, unsaturated dimeric fatty acids of 10 to 48 carbon atoms and alkyl esters of said dimeric fatty acids having 1 to 4 alkyl carbon atoms and condensation products of said alcohols, acids or esters with an alkylene oxide selected from the group consisting of ethylene oxide and propylene oxide.

6. The composition of claim 1 wherein the aliphatic-cycloaliphatic polyhydroxyl compound is condensed with 1 to 6 moles of propylene oxide.

7. The composition of claim 1 wherein the phenol adduct is condensed with 1 to 6 moles of propylene oxide.

8. The composition of claim 1 wherein the composition contains 0.0001 to 0.1% by weight of triethylamine based on the weight of the isocyanate and hydroxyl compound.

9. A polyurethane coating having high chemical and mechanical resistance and good color fastness formed by applying a composition of claim 1 to a substrata and curing the said composition.

References Cited
UNITED STATES PATENTS

| | | | |
|---|---|---|---|
| 3,378,531 | 4/1968 | Heins et al. | 260—77.5 |
| 3,336,242 | 8/1967 | Hampson et al. | 260—77.5 X |
| 3,265,666 | 8/1966 | Brown et al. | 260—410.5 X |
| 3,250,745 | 5/1966 | Davis et al. | 260—77.5 X |
| 2,947,714 | 8/1960 | Le Clerq et al. | 260—77.5 X |
| 2,645,623 | 7/1953 | Hermann | 260—18 |

DONALD E. CZAJA, Primary Examiner

C. W. IVY, Assistant Examiner

U.S. Cl. X.R.

260—77.5, 47